US008180963B2

(12) United States Patent
Conte et al.

(10) Patent No.: US 8,180,963 B2
(45) Date of Patent: May 15, 2012

(54) HIERARCHICAL READ-COMBINING LOCAL MEMORIES

(75) Inventors: Thomas Martin Conte, Atlanta, GA (US); Andrew Wolfe, Los Gatos, CA (US)

(73) Assignee: Empire Technology Development LLC, Wilmington, DE (US)

( * ) Notice: Subject to any disclaimer, the term of this patent is extended or adjusted under 35 U.S.C. 154(b) by 427 days.

(21) Appl. No.: 12/470,256

(22) Filed: May 21, 2009

(65) Prior Publication Data

US 2010/0299481 A1    Nov. 25, 2010

(51) Int. Cl.
*G06F 12/00* (2006.01)
(52) U.S. Cl. .................................. 711/117; 711/114
(58) Field of Classification Search .................. 711/117, 711/114
See application file for complete search history.

(56) References Cited

U.S. PATENT DOCUMENTS

| 2003/0126515 | A1* | 7/2003 | Abdo ............................... 714/43 |
| 2007/0174746 | A1* | 7/2007 | Haefliger et al. ............. 714/721 |
| 2007/0266206 | A1* | 11/2007 | Kim et al. ...................... 711/118 |
| 2008/0195646 | A1* | 8/2008 | Meijer et al. .................. 707/102 |
| 2008/0271021 | A1* | 10/2008 | Bendapudi et al. ........... 718/100 |
| 2009/0083493 | A1* | 3/2009 | Kinter ............................ 711/141 |
| 2009/0198890 | A1* | 8/2009 | Kim et al. ...................... 711/117 |
| 2009/0313435 | A1* | 12/2009 | Thantry et al. ................ 711/120 |
| 2010/0083247 | A1* | 4/2010 | Kanevsky et al. ................ 718/1 |

* cited by examiner

*Primary Examiner* — Michael Tran
(74) *Attorney, Agent, or Firm* — Dorsey & Whitney LLP

(57) ABSTRACT

The present disclosure relates to a system for hierarchical read-combining memory having a multicore processor operably coupled to a memory controller. The memory controller is configured for receiving a plurality of requests for data from one or more processing cores of the multicore processor, selectively holding a request for data from the plurality of requests for an undetermined or indefinite amount of time, and selectively combining a plurality of requests for the same data into a single read-combined data request. The present disclosure further relates to a method for hierarchical read-combining data requests of a multicore processor and a computer accessible medium having stored thereon computer executable instructions for performing a procedure for hierarchical read-combining data requests of a multicore processor.

20 Claims, 6 Drawing Sheets

HIERARCHICAL READ-COMBINING LOCAL MEMORIES

BACKGROUND

Numerous existing processor architectures support parallel processing. The earliest such architectures used multiple discrete processors networked together. More recently, multiple processing cores have been fabricated on a single integrated chip. In multicore processing, at any given point in time, more than one of the processing cores may be making requests to memory. Oftentimes, more than one of the processing cores may be requesting the same data from the same memory.

BRIEF DESCRIPTION OF THE FIGURES

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION

Figure 1A:
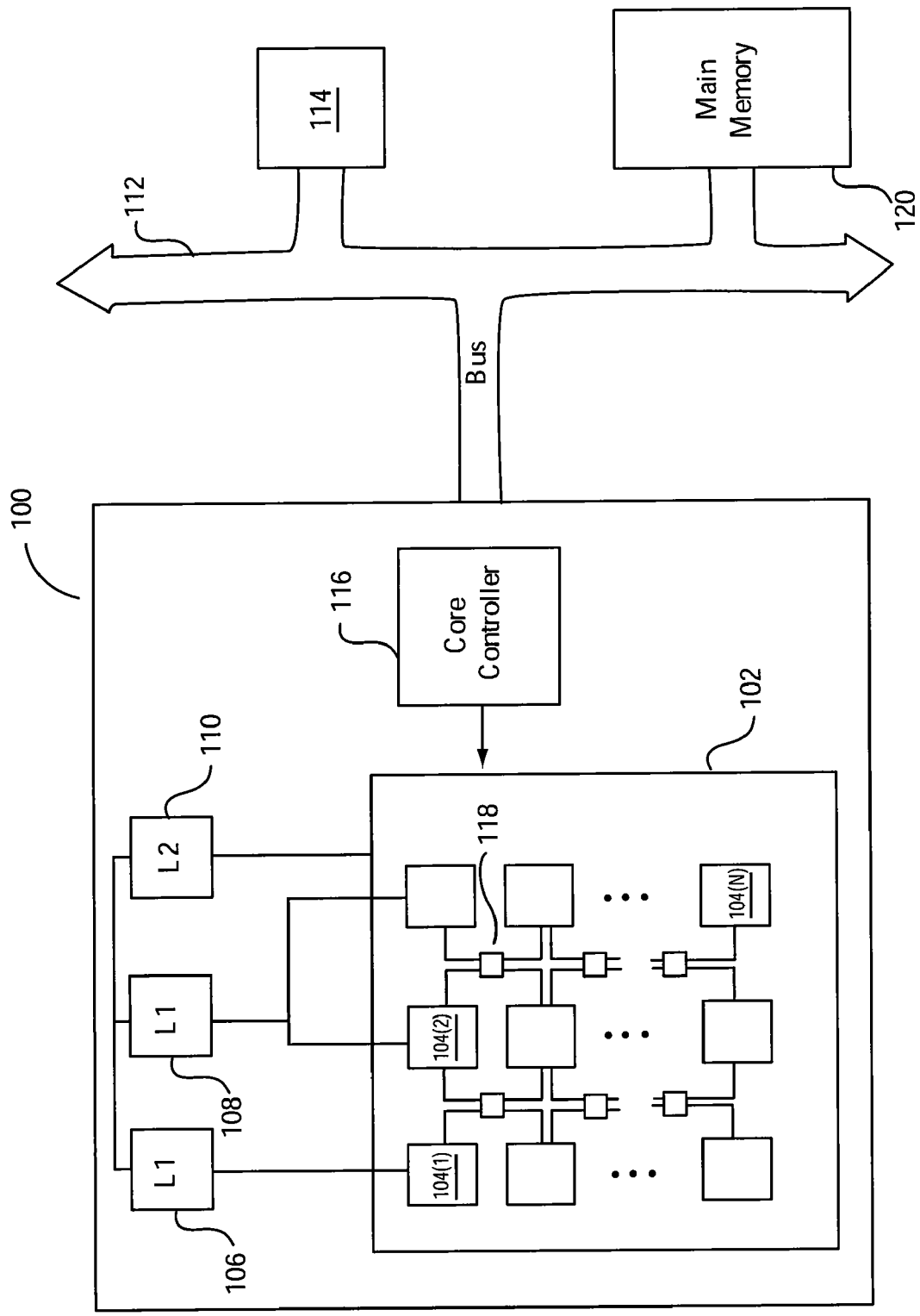
FIG. 1a is a schematic of an illustrative example of a multicore processor.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein. Additionally, some well-known structures, circuits, techniques, and the like have not been described in detail, to avoid unnecessarily obscuring the disclosure.

In multicore processing, at any given point in time, more than one of the processing cores may be making requests to a cache memory or main memory. Particularly, more than one of the processing cores may be requesting the same data. Oftentimes, there may not be sufficient bandwidth to rapidly fulfill all of these data requests. In order to increase efficiency of cache memory use and reduce the bandwidth demands on, for example, main memory, hierarchical read-combining cache memory can be used. Hierarchical read-combining cache memory can include passing data requests through a memory controller. The memory controller may then hold a single new request for data for some period of time in order to wait for additional requests from the same processing core or other processing core(s) that request the same chunk of data. The requests may be combined or aggregated into a single read request. Hierarchical read-combining combining cache memory can lead to reduction in bandwidth demands and increase overall efficiency of use of cache memory.

FIG. 1a illustrates an illustrative multicore processor 100, including a single integrated circuit having a processing core array 102, in accordance with one example. In other examples a multicore processor may include processors on separate integrated chips. The term multicore processor, as used herein, may include two or more processing cores on a single integrated circuit, multiple separate integrated circuits, or any combination thereof. The processing core array 102 can include some number (N) of processing cores 104(1)-104(N). Any suitable number of processing cores 104 may be provided. A processing core 104 can include logic for executing program instructions.

As may be appreciated by one skilled in the art, the multicore processor 100 may be provided in a suitable computing environment, such as a personal computer. A computing environment can include the multicore processor 100, system memory, one or more buses, and one or more I/O devices, such as a keyboard, mouse, touch screen, display device, such as a conventional CRT or LCD based monitor, USB or other port connections, CD drives, DVD drives, and the like. Bus connections among the various components may be implemented using bus protocols such as Peripheral Component Interconnect (PCI), PCI Express, Accelerated Graphics Port (AGP), HyperTransport, or any other suitable bus protocol, and connections between different devices may use different protocols. A personal computer may operate in a networked environment using logical connections to one or more remote computers. Such remote computers may be, for example, other personal computers, servers, routers, network PCs, peer devices, or other common network nodes. Logical connections may comprise, for example, a local-area network (LAN) or a wide-area network (WAN).

The multicore processor 100 may include any combination of dedicated or shared resources. A dedicated resource may be a resource 106 dedicated to a single processing core 104, such as a dedicated level one cache, or may be a resource 108 dedicated to any subset of the processing cores 104. A shared resource may be a resource 110 shared by all of the cores 104, such as a shared level two cache or a shared external bus 112 supporting an interface between the multicore processor 100 and another component 114, or may be a resource shared by any subset of the processing cores 104. A shared resource may also include main memory 120, which may be any suitable form of memory including, but not limited to, RAM, ROM, flash storage, magnetic disk storage, tape storage, optical storage, or other machine-readable storage mediums. The bus 112 may be suitable type of bus including, for example, a memory bus or memory controller, a peripheral bus, or a local bus, and may use any of a variety of bus structures.

As stated above, multicore processor 100 may have any suitable number of processing cores 104. For example, multicore processor 100 may have two (2) cores, four (4) cores, tens of cores, and even hundreds or more of processing cores. Some multicore processors may be homogenous, such that each of the processing cores use a single core design. Other multicore processors may be heterogeneous, such that one or more of the processing cores may be different from one or more of other processing cores, and each core or subset of cores may be optimized for a different role in the multicore processor 100.

The multicore processor 100 may include a core controller, or core interface 116. Core controller 116 may determine which processing tasks are to be processed by each processing core 104. In one example, processing tasks may be routed to selected processing cores using one or more switches 118.

FIG. 1a is an illustrative schematic of a multicore processor and does not illustrate physical location of the components illustrated therein. It is appreciated that the multicore processor 100 described herein is illustrative and that variations and modifications are possible. Design choices may be driven by, for example, considerations of hardware size and complexity versus performance.

Figure 1B:
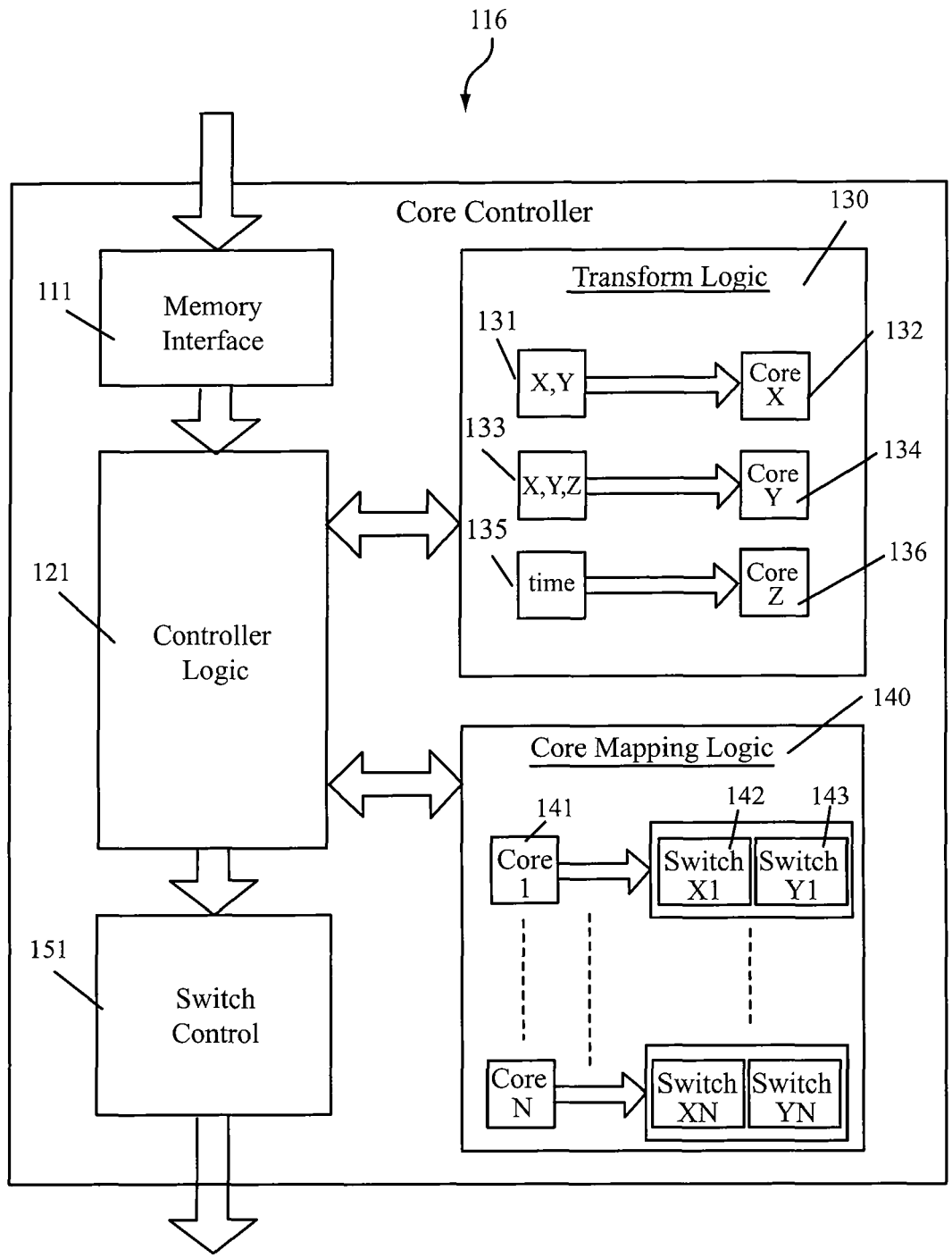
FIG. 1b is a schematic of an illustrative example of a core controller, in accordance with the present disclosure.

FIG. 1b depicts one example of a core controller 116. In this example, data may be transferred to main memory via a memory interface 111. The memory interface 111 may interface with any type of memory storage hardware, which may include among others, for example, RAM, cache, CD-ROM, or hard disk. Data may flow through the memory interface 111 to a core via switches based on controller logic 121 and switch control 151. The controller logic 120 may utilize with two logic blocks, transform logic 130 and core mapping logic 140. Within the transform logic 130, a plurality of logic blocks may be used correlating to the provided cores. Thus, in the example shown, logic is provided for each of Core X 132, Core Y 134, and Core Z 136. In this example, the x,y data block 131 is transformed into Core X 132, the x,y,z data block 133 is transformed into Core Y 134, and the time data block 135 is transformed into Core Z 136. It is to be appreciated that the specific data blocks and cores illustrated are meant for illustrative purposes only and are not intended to be limiting. After data has been transformed in the transform logic 130, it may be flow through the controller logic 121 for further use with core mapping logic 140. Within the core mapping logic 140, a plurality of logic blocks may be used correlating the core determinations 132, 134, and 136 to the appropriate switch. The example shows a plurality of processor cores 1 through n. Data from each core n may assigned to two switch blocks, Xn and Yn for transfer to the appropriate core via switch control 151. Thus, data from the core 1 block 141 may be transferred to switch blocks X1 142 and Y1 143. After data has been mapped in the core mapping logic 140, it may flow through controller logic 120. When data exits the controller logic 120, the data may then flow to a switch control 150. The switch control 150 is responsible for routing the data to a processor core. Thus, from the switch control 150, data may be transferred out of the core controller and to the appropriate core, determined at the transform logic block 130.

Figure 1C:
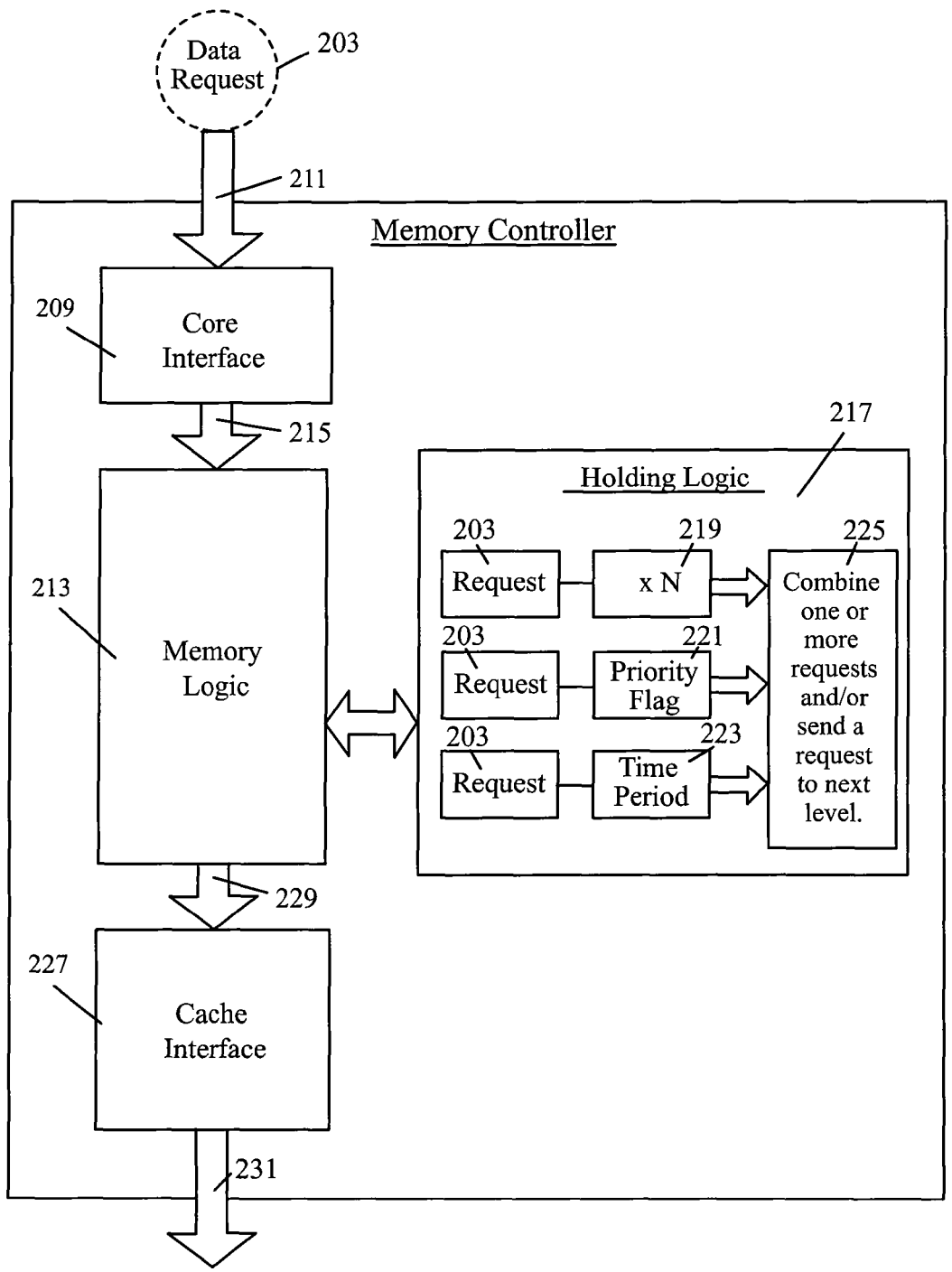
FIG. 1c is a schematic of an illustrative example of a memory controller, in accordance with the present disclosure.

FIG. 1c illustrates one example of a memory controller 204. As shown, the memory controller receives a data request 203 from a processing core via core interface 209. The core interface 209 may be operatively coupled to the processing core via a data bus 211 or other suitable connection. The core interface 209 transmits the request to the memory logic 213, also via a data bus 215 or other suitable connection. The memory logic 213 may, in some examples, utilize a holding logic 217 to determine whether to hold the request 203 and/or when to send the request 203 on to a cache. The logic may be based on the number of times certain data has been requested (shown by x N in box 219), based on a priority flag box 221, or based on a predetermined holding time period 223. In some examples, after data has been requested a certain number of times, it may receive a priority flag. In other examples, other criteria for the holding logic may be used, some of which are described with respect to FIG. 2. Generally, the holding logic may hold the request 203, may combine a plurality of requests 203, and/or may send the request 203 to the next level (shown at block 225). When the request is sent on, the memory logic transmits the request 203 to a cache interface 227, for example via a data bus 229 or other suitable connection. The cache interface 227 transmits the request to a suitable cache, described with respect to FIG. 2, via a data bus 231 or other suitable connection.

Figure 2:
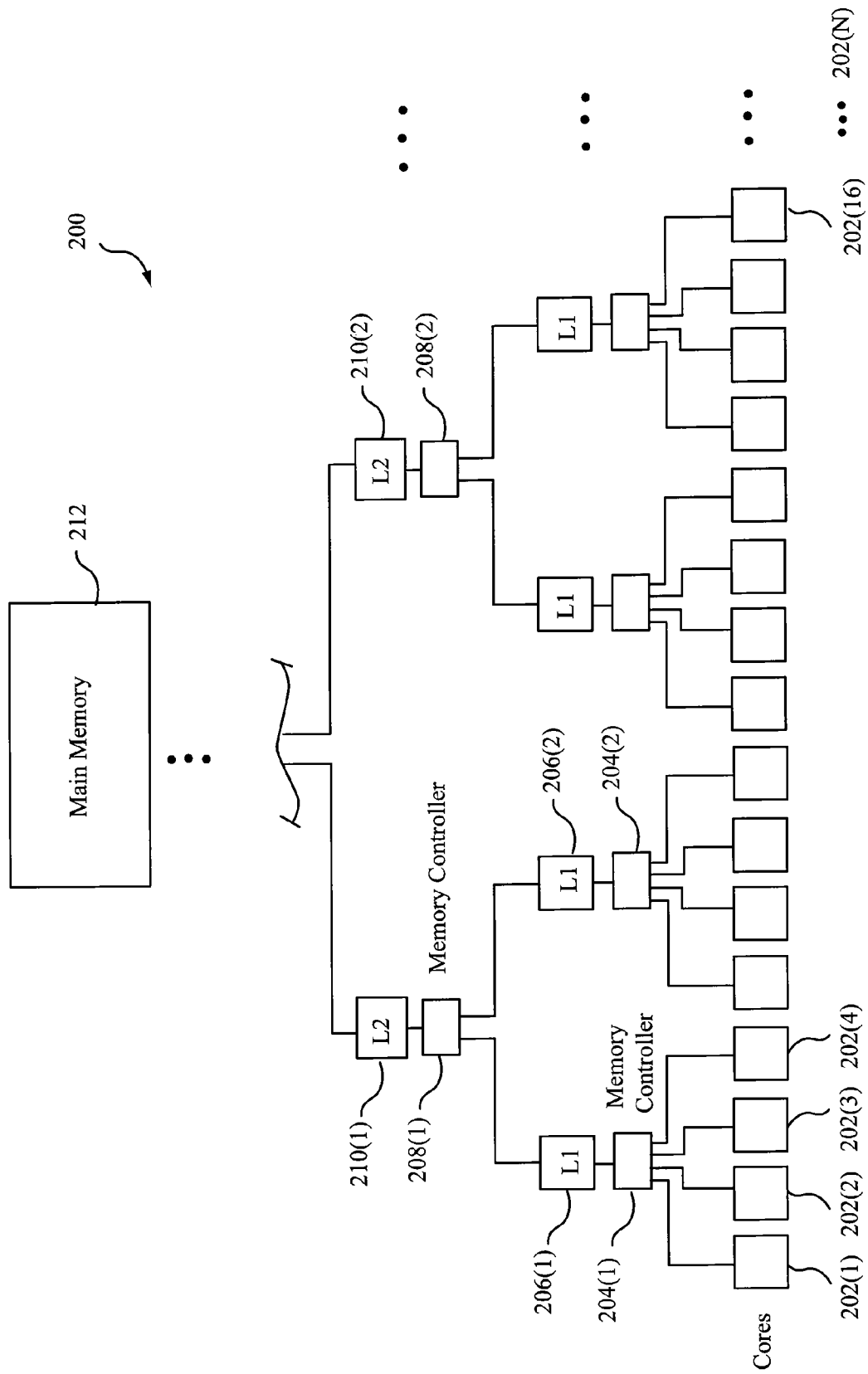
FIG. 2 is a schematic of hierarchical read-combining cache memory according to an illustrative example of the present disclosure.

With reference to FIG. 2, in one example of hierarchical read-combining cache memory 200, each of the processing cores 202 may pass requests for data through a memory controller 204. The memory controller 204, may hold the data request for some period of time, in order to wait for additional requests for the same chunk of data from the same core or other core or cores. Thus, each of the requests for the same data can be combined into a single data request.

The amount of time that the memory controller 204 may hold the request can be determined by any suitable indicator, characteristic, factor, or the like relating to the data request. In one example, the amount of time that the memory controller 204 may hold the request can be determined by an indicator of read priority. In one example, the read priority for a particular data request may increase as the number of requests for the same data increases. For example, in one example, the read priority for a particular data request may increase when more than one core requests the same data (e.g., data requested by four (4) cores can have a relatively higher priority than data requested by two (2) cores).

In other examples, the amount of time that the memory controller 204 may hold the request for the data may depend on other indicators or factors, alone or in combination. Some of these other factors can include, but are not limited to, whether the bus above the memory controller (i.e., closer to the target memory) is currently available, or free, whether the memory controller 204 is getting ready to release a data request, and/or whether the number of cores 202 requesting a given chunk of data has surpassed a designated threshold relating to the number of core requests. For example, if the memory controller 204 is ready to, or is getting ready to, release a data request, the request may instead be fulfilled earlier. Similarly, in another example, if many of the processing cores 202 have requested a given chunk of data, then the memory controller 204 may continue to hold the data request under an assumption that the remaining cores may also soon request the same data.

As illustrated in FIG. 2, the memory may be organized in a hierarchy of any suitable number of read-combining buffers. FIG. 2 is an illustrative schematic of one example of hierarchical read-combining memory and does not illustrate physical location of the components illustrated therein. As illustrated in FIG. 2, subsets of processing cores 202 request data from a respective memory controller 204. A subset may comprise one or more processing cores 202. In some examples, one or more of the processing cores 202 may each have a local cache memory from which data requests may initially be processed; if the data request cannot be satisfied by the local cache memory for the processing core, then the request may be sent up the hierarchy as described herein. In the illustrative example of FIG. 2, for example, the subset of processing cores 202(1)-202(4) may request data from memory controller 204(1), the subset of processing cores 202(5)-202(8) may request data from memory controller 204(2), etc. In alternative examples, any number of processing cores may each request data from a respective memory controller, and the number of processing cores in a subset is not limited to four (4) cores, as is illustrated in the example of FIG. 2. Similarly, the number of processing cores in each subset need not be homogenous, and the size of each subset may vary from subset to subset and still fall within the spirit and scope of the present disclosure. That is, the processing cores may be evenly distributed to the subsets or may be unevenly distributed to the subsets. Additionally, in some examples, there may be any number of memory controllers 204, wherein any number of subsets of processing cores 202 may request data from the same memory controller 204, and the memory controller 204 can handle the separate control of each separate subset of processing cores 202.

Each memory controller 204 may decide to hold any data request from the respective subset of cores for some period of time, in order to wait for additional requests for the same chunk of data from the same core or other core or cores in the respective subset. As requests for the same data from further processing cores increase, the requests can be read-combined into a single data request to a respective level one (L1) cache 206. In the illustrative example of FIG. 2, for example, the memory controller 204(1) may send the read-combined request to L1 cache 206(1), the memory controller 204(2) may send the read-combined request to L1 cache 206(2), etc. If the data is not available in the L1 cache 206, the data may be requested from the next level of the hierarchy 200.

The next level of hierarchy in the example of FIG. 2 is the memory controller 208. Accordingly, if the data is not available in the L1 cache 206, that data may be requested from memory controller 208. In the illustrative example of FIG. 2, for example, a subset of L1 cache 206(1) and 206(2) may request data from memory controller 208(1), while another subset of L1 cache may request data from memory controller 208(2), etc. In alternative examples, any number of L1 caches may each request data from a respective memory controller, and the number of L1 caches in a subset is not limited to two (2) caches, as is illustrated in the example example of FIG. 2. Similarly, the number of L1 caches in each subset need not be homogenous, and the size of each subset may vary from subset to subset and still fall within the spirit and scope of the present disclosure. That is, the L1 caches may be evenly distributed to the subsets or may be unevenly distributed to the subsets. Additionally, in some examples, there may be any number of memory controllers 204, wherein any number of subsets of processing cores 202 and/or L1 caches 206 may request data from the same memory controller 204, and the memory controller 204 can handle the separate control of each separate subset of processing cores 202 and/or L1 caches 206.

Each memory controller 208 may hold any data request from the respective subset of L1 cache for some period of time, in order to wait for additional requests for the same chunk of data from the same L1 cache or other L1 cache or caches in the respective subset. As requests for the same date from further caches increase, the requests can be read-combined into a single data request to a respective level two (L2) cache 210. In the illustrative example of FIG. 2, for example, the memory controller 208(1) may send the read-combined request to L2 cache 210(1), memory controller 210(2) may send the read-combined request to L2 cache 210(2), etc. If the data is not available in the L2 cache, the data may be requested from the next level of the hierarchy 200, in substantially the same manner as previously described with respect to the previous levels of the hierarchy 200. For example, L2 caches 210(1), 210(2), and any number of other L2 caches may form a subset of L2 caches that may request data to a respective memory controller associated with that subset of L2 caches, thereby allowing the subset of L2 caches to have their data requests read-combined. As with previous levels of the hierarchy, any number of L2 caches may each request data from a respective memory controller, and the number of L2 caches in a subset is not limited to any specific number of caches. Similarly, the number of L2 caches in each subset need not be homogenous, and the size of each subset may vary from subset to subset and still fall within the spirit and scope of the present disclosure. That is, the L2 caches may be evenly distributed to the subsets or may be unevenly distributed to the subsets. Additionally, in some examples, there may be any number of memory controllers 204, wherein any number of subsets of processing cores 202, L1 caches 206, and/or L2 caches 210 may request data from the same memory controller 204, and the memory controller 204 can handle the separate control of each separate subset of processing cores 202, L1 caches 206, and/or L2 caches 210.

Data requests may propagate through the hierarchy 200, in the described manner, through any suitable number of levels of read-combining buffers. In one example, main memory 212 may comprise the top level of the hierarchy 200. Main memory 212 may be any suitable form of memory including, but not limited to, RAM, ROM, flash storage, magnetic disk storage, tape storage, optical storage, or other machine-readable storage mediums. In some examples, there may be more than one form of main memory 212.

Figure 3:
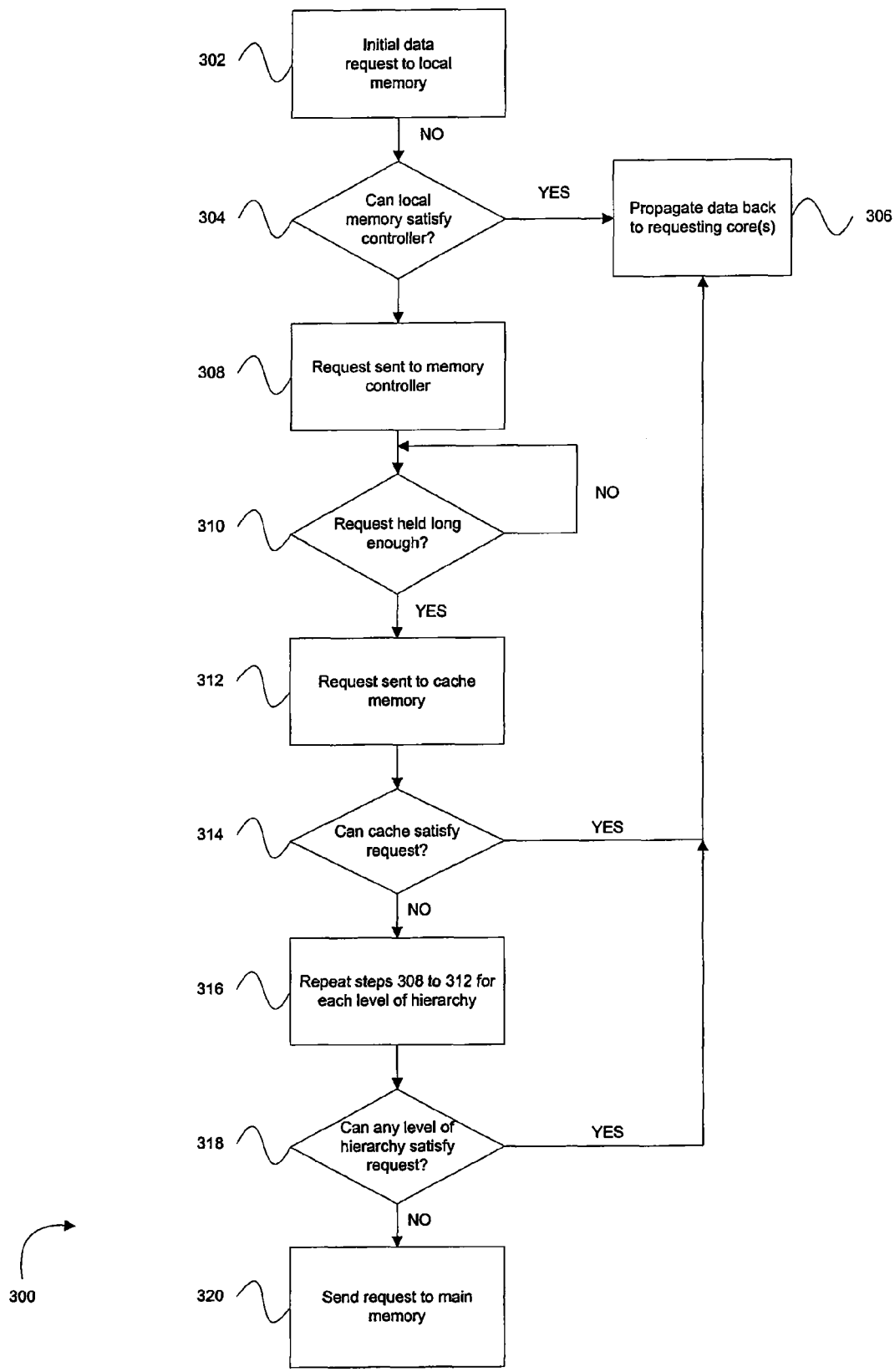
FIG. 3 is an example flow diagram of a method of hierarchical read-combining cache memory according to an illustrative example of the present disclosure.

An illustrative example of a method for hierarchical read-combining 300 is shown in the schematic of FIG. 3. Initially, in one example, at step 302, a local processing core may request data from any memory, such as cache memory, local to that processing core. In step 304, if the local memory can satisfy the data request, then the requested data is propagated to the requesting processing core, shown in step 306. If the local memory cannot satisfy the data request from the processing core, the data request may be sent to a memory controller, as illustrated in step 308. In other examples, a local processing core may not be provided with a local memory, and steps 302 and 304 may be skipped. The memory controller may receive data requests from any suitable number of processing cores, such as one or more processing cores. In step 310, the memory controller may hold the data request for some period of time, in order to wait for additional data requests for the same chunk of data from the same core or other core or cores. The amount of time that the memory controller may hold the data request can be determined by any suitable indicator, characteristic, factor, or the like relating to the data request. As previously described, in one example, the amount of time that the memory controller may hold the request can be determined by an indicator of read priority. In one example, the read priority for a particular data request may increase as the number of requests for the same data increases. Thus, in one example, the read priority for a particular data request may increase when the same processing core requests the same data more than once and/or more than one processing core requests the same data.

As also previously described, in other examples, the amount of time that the memory controller may hold the request for the data may depend on other indicators or factors, alone or in combination. Some of these other factors can include, but are not limited to, whether the bus above the memory controller (i.e., closer to the target memory) is currently available, or free, whether the memory controller is getting ready to release a data request, and/or whether the number of cores requesting a given chunk of data has surpassed a designated threshold relating to the number of core requests. Furthermore, in some examples, a timer or counter can be used to set a predetermined maximum time for combining requests. Alternatively, the timer or counter can be used in combination with other factors, such as those disclosed above, to increase the priority of a data request or to reduce the threshold levels of other factors.

Returning to FIG. 3, in step 312, according to one example, once the memory controller has determined that it has held off long enough or otherwise determined that the data request should be sent on, the data request can be sent to cache memory, such as L1 cache memory. If, in step 314, the L1 cache memory can satisfy the data request, the data requested is propagated back to the requesting core or cores, as shown in step 306. If the L1 cache memory cannot satisfy the data request, the request can be sent to another memory controller further up in the hierarchy, as shown in step 316. However, as described above, there may be any number of memory controllers, and in some examples, there may be a single memory controller for all memory, a single memory controller for each level of the hierarchy, or any other suitable configuration of memory controllers. The next level memory controller may receive data requests from any suitable number of L1 cache memories, such as one or more L1 cache memories. In step 316, steps 308 through 312 may then be substantially repeated for each level of the hierarchy until a cache memory is able to satisfy the data request, as shown in step 318. If none of the lower levels of the hierarchy can satisfy the data request, the data request may be sent to the main memory, as shown in step 320. In some examples, the main memory may be generally at the top of the hierarchy. In such instances wherein the data request reaches the main memory in step 320, the main memory, if possible, may satisfy the data request.

Figure 4:
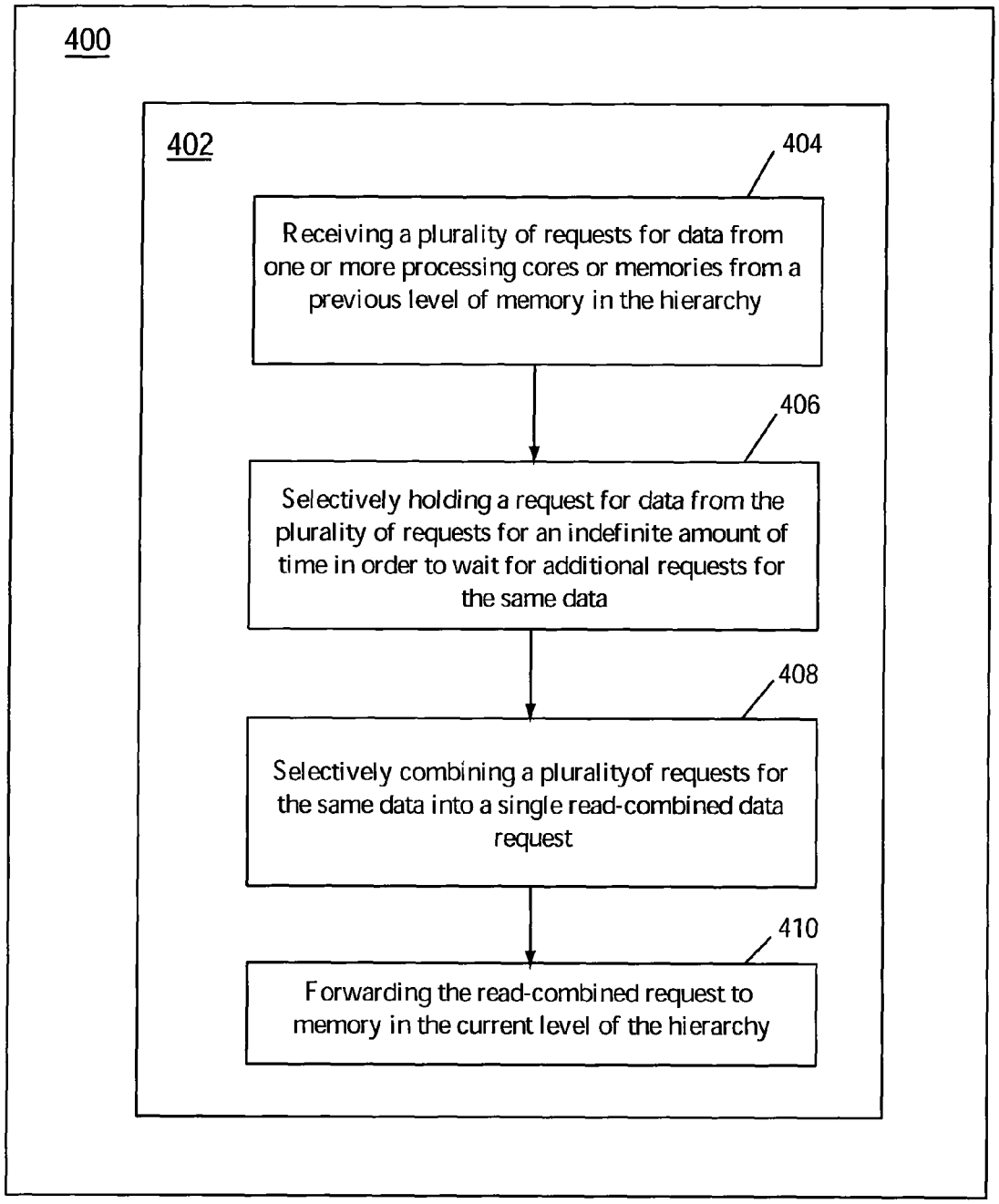
FIG. 4 is a schematic of a system for performing a method of hierarchical read-combining cache memory according to an illustrative example of the present disclosure.

In one particular example, as shown in the schematic of FIG. 4, a computer system 400 may include a processor 402 configured for performing an example of a method for hierarchical read-combining of a multicore processor having a hierarchy of memory. In other examples, various steps or portions of various steps of the method may be performed outside of the processor 402. In step 404, the method may include, for each level of memory in the hierarchy, receiving a plurality of requests for data from one or more processing cores or memories from a previous level of memory in the hierarchy. In step 406, the method may include selectively holding a request for data from the plurality of requests for an undetermined or indefinite amount of time in order to wait for additional requests for the same data. In step 408, the method may include selectively combining a plurality of requests for the same data into a single read-combined data request. In step 410, the method may include forwarding the read-combined request to memory in the current level of the hierarchy.

Although described in detail with respect to multicore processors, hierarchical read-combining cache memory, as described in detail in various examples herein, is not limited to use with only multicore processing cores and may be used with respect to any processing or computing components that request data from another source, such as but not limited to any processing or computing component with Direct Memory Access (DMA) capability. Similarly, each of the processing or computing components in an example of hierarchical read-combining cache memory do not need to be homogenous, and any combination of processing or computing components may be used with the various examples of the present disclosure.

The foregoing describes various examples of hierarchical read-combining memory. Following are specific examples of methods and systems of hierarchical read-combining memory having a multicore processor operably coupled to a memory controller. These are for illustration only and are not intended to be limiting.

The present disclosure relates to a system for hierarchical read-combining memory having a multicore processor operably coupled to a memory controller. The memory controller is configured for receiving a plurality of requests for data from one or more processing cores of the multicore processor, selectively holding a request for data from the plurality of requests for an undetermined or indefinite amount of time, and selectively combining a plurality of requests for the same data into a single read-combined data request.

In some examples, the system for hierarchical read-combining memory may further include a hierarchy of one or more levels of memory and a plurality of memory controllers. Each memory controller is configured for receiving a plurality of data requests from one or more processing cores or memories from a previous level of memory in the hierarchy, selectively holding a request for data from the plurality of requests for an undetermined or indefinite amount of time, and selectively combining a plurality of requests for the same data into a single read-combined data request. The memory controllers can hold a data request for an undetermined or indefinite amount of time in order to wait for additional requests for the same data and can hold a data request based on an indicator of read priority for the data. In other examples, the read priority increases as the number of requests for the same data increases. In further examples, the memory of each level of the hierarchy below the top level can include cache memory. The top level memory may include main memory. In yet further examples, the processing cores can be evenly or unevenly distributed into subsets of processing cores, each subset requesting data from a respective one of the plurality of memory controllers.

The present disclosure also relates to a method for hierarchical read-combining data requests of a multicore processor having two or more processing cores and a hierarchy of memory comprising at least one level. The method includes, for each level of memory in the hierarchy, receiving a plurality of requests for data from one or more processing cores or memories from a previous level of memory in the hierarchy, selectively holding a request for data from the plurality of requests for an undetermined or indefinite amount of time in order to wait for additional requests for the same data, selectively combining a plurality of requests for the same data into a single read-combined data request, and forwarding the read-combined request to memory in the current level of the hierarchy.

In various examples, the memory of each level of the hierarchy below the top level can include cache memory. A top level of the hierarchy can include main memory. In further examples, selectively holding a request for data from the plurality of requests includes holding the request for an undetermined or indefinite amount of time based on an indicator, such as an indicator of read priority, related to the data request. In some examples, the read priority increases as the number of requests for the same data increases.

The present disclosure further relates to a computer accessible medium having stored thereon computer executable instructions for performing a procedure for hierarchical read-combining data requests of a multicore processor having two or more processing cores. The procedure includes, for each level of memory in a hierarchy of memory, receiving a plurality of requests for data from one or more processing cores or memories from a previous level of memory in the hierarchy, holding a request for data from the plurality of requests for an undetermined or indefinite amount of time in order to wait for additional requests for the same data, combining a plurality of requests for the same data into a single read-combined data request, and forwarding the read-combined request to memory in the current level of the hierarchy.

In some examples, the top level of the hierarchy may include main memory, and each level of the hierarchy below the top level may include cache memory. In further examples, holding a request for data from the plurality of requests for an undetermined or indefinite amount of time can include holding the requests based on an indicator of read priority for the data. The read priority can increase as the number of requests for the same data increase.

The present disclosure is not to be limited in terms of the particular examples described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the examples disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A system for hierarchical read-combining memory comprising:
    a multicore processor operably coupled to a memory controller;
    a hierarchy of one or more levels of memory; and
    a plurality of memory controllers, including the memory controller operably coupled to the multicore processor;
    wherein each of the plurality of memory controllers is configured to receive a plurality of requests for data from one or more processing cores of the multicore processor or from one or more memories in a first level of the hierarchy, selectively hold a request for data from the plurality of requests for an undetermined amount of time, and selectively combine a plurality of requests for the same data into a single read-combined data request for another level of the hierarchy.

2. The system for hierarchical read-combining memory of claim 1, wherein each of the memory controllers are further configured to hold a request for data for an undetermined amount of time in order to wait for additional requests for the same data.

3. A system for hierarchical read-combining memory comprising:
    a multicore processor operably coupled to a memory controller;
    wherein the memory controller is configured to receive a plurality of requests for data from one or more processing cores of the multicore processor, selectively hold a request for data for an undetermined amount of time based on an indicator of read priority for the data in order to wait for additional requests for the same data, and selectively combine a plurality of requests for the same data into a single read-combined data request.

4. The system for hierarchical read-combining memory of claim 3, wherein the read priority increases as the number of requests for the same data increases.

5. The system for hierarchical read-combining memory of claim 1, wherein the memory of each level of the hierarchy below a top level comprises cache memory.

6. The system for hierarchical read-combining memory of claim 1, wherein a top level of the hierarchy comprises main memory.

7. The system for hierarchical read-combining memory of claim 1, wherein the processing cores are evenly distributed into subsets of processing cores, and wherein each subset is configured to requesting data from a respective one of the plurality of memory controllers.

8. The system for hierarchical read-combining memory of claim 1, wherein the processing cores are unevenly distributed into subsets of processing cores, and wherein each subset is configured to requesting data from a respective one of the plurality of memory controllers.

9. A method for hierarchical read-combining data requests of a multicore processor having two or more processing cores and a hierarchy of memory comprising at least one level, the method comprising, for each level of memory in the hierarchy:
- receiving a plurality of requests for data from one or more processing cores or from a first level of memory in the hierarchy;
- selectively holding a request for data from the plurality of requests for an undetermined amount of time in order to wait for additional requests for the same data;
- selectively combining a plurality of requests for the same data into a single read-combined data request; and
- forwarding the read-combined request to memory in another level of the hierarchy.

10. The method for hierarchical read-combining data requests of claim 9, wherein the memory of each level of the hierarchy below the top level comprises cache memory.

11. The method for hierarchical read-combining data requests of claim 10, wherein a top level of the hierarchy comprises main memory.

12. The method for hierarchical read-combining data requests of claim 9, wherein selectively holding a request for data from the plurality of requests comprises holding the request for an undetermined amount of time based on an indicator related to the request for data.

13. The method for hierarchical read-combining data requests of claim 12, wherein the indicator related to the request for data is an indicator of read priority for the data request.

14. The method for hierarchical read-combining data requests of claim 13, wherein the read priority increases as the number of requests for the same data increases.

15. A computer accessible medium having stored thereon computer executable instructions for performing a procedure for hierarchical read-combining data requests of a multicore processor having two or more processing cores, the procedure comprising, for each level of memory in a hierarchy of memory:
- receiving a plurality of requests for data from one or more processing cores or from memories from one level of memory in the hierarchy;
- selectively holding a request for data from the plurality of requests for an undetermined amount of time in order to wait for additional requests for the same data;
- selectively combining a plurality of requests for the same data into a single read-combined data request; and
- forwarding the read-combined request to memory in another level of the hierarchy.

16. The computer accessible medium of claim 15, wherein the top level of the hierarchy includes main memory.

17. The computer accessible medium of claim 15, wherein the memory of each level of the hierarchy below the top level comprises cache memory.

18. The computer accessible medium of claim 17, wherein holding a request for data from the plurality of requests for an undetermined amount of time in order to wait for additional requests for the same data comprises holding the requests based on an indicator of read priority for the data.

19. The computer accessible medium of claim 18, wherein the read priority increases as the number of requests for the same data increases.

20. A system for hierarchical read-combining memory comprising:
- a multicore processor operably coupled to a memory controller;
- a hierarchy of one or more levels of memory; and
- a plurality of memory controllers, including the memory controller operably coupled to the multicore processor;
- wherein each of the plurality of memory controllers is configured to receive a plurality of requests for data from one or more processing cores of the multicore processor or from memories in one level of the hierarchy, selectively hold a first request for data from the plurality of requests for a predetermined amount of time, and selectively combine one or more additional requests for the same data with the first request into a single read-combined data request for another level of the hierarchy.

* * * * *

UNITED STATES PATENT AND TRADEMARK OFFICE
CERTIFICATE OF CORRECTION

| | | |
|---|---|---|
| PATENT NO. | : 8,180,963 B2 | Page 1 of 1 |
| APPLICATION NO. | : 12/470256 | |
| DATED | : May 15, 2012 | |
| INVENTOR(S) | : Conte et al. | |

It is certified that error appears in the above-identified patent and that said Letters Patent is hereby corrected as shown below:

In Column 3, Line 28, delete "120" and insert -- 121 --, therefor.

In Column 3, Line 51, delete "150." and insert -- 151. --, therefor.

In Column 3, Line 52, delete "150" and insert -- 151 --, therefor.

In Column 3, Line 53, delete "150," and insert -- 151, --, therefor.

In Column 5, Line 39, delete "example example" and insert -- example --, therefor.

Signed and Sealed this
Thirty-first Day of July, 2012

David J. Kappos
*Director of the United States Patent and Trademark Office*